US012241696B2

(12) United States Patent
Antelius et al.

(10) Patent No.: US 12,241,696 B2
(45) Date of Patent: Mar. 4, 2025

(54) ELECTROHYDRODYNAMICS SYSTEM AND METHOD

(71) Applicant: APR Technologies AB, Enköping (SE)

(72) Inventors: Mikael Antelius, Täby (SE); Henrik Löfgren, Uppsala (SE); Are Björneklett, Västerås (SE); Peter Nilsson, Sundbyberg (SE); Robert Thorslund, Sigtuna (SE)

(73) Assignee: APR Technologies AB (SE)

( * ) Notice: Subject to any disclaimer, the term of this patent is extended or adjusted under 35 U.S.C. 154(b) by 261 days.

(21) Appl. No.: 17/774,825

(22) PCT Filed: Nov. 6, 2020

(86) PCT No.: PCT/EP2020/081239
§ 371 (c)(1),
(2) Date: May 5, 2022

(87) PCT Pub. No.: WO2021/089757
PCT Pub. Date: May 14, 2021

(65) Prior Publication Data

US 2022/0390190 A1 Dec. 8, 2022

(30) Foreign Application Priority Data

Nov. 8, 2019 (SE) .................................. 1951280-5

(51) Int. Cl.
*G21K 5/00* (2006.01)
*F04B 17/00* (2006.01)
(Continued)

(52) U.S. Cl.
CPC .............. *F28F 13/16* (2013.01); *F04B 17/00* (2013.01); *F04B 19/04* (2013.01); *G21K 5/00* (2013.01)

(58) Field of Classification Search
CPC G21K 5/00; G21K 5/02; G21K 1/025; G21K 1/10; G21K 5/10; G21K 5/08;
(Continued)

(56) References Cited

U.S. PATENT DOCUMENTS 1,274,875 A 8/1918 Gruman
4,396,055 A 8/1983 Mitchell, Jr.
(Continued)

FOREIGN PATENT DOCUMENTS

CN 102548359 A 7/2012
CN 108475667 A 8/2018
(Continued)

OTHER PUBLICATIONS

Jin Y M, Fan Y S. "Physical Principle of Law Temperature Plasmas". Beijing: Tsinghua University Press, 1983.

*Primary Examiner* — Irakli Kiknadze
(74) *Attorney, Agent, or Firm* — Condo Roccia Koptiw LLP

(57) ABSTRACT

A method for altering one or more properties of a dielectric fluid for use in an electrohydrodynamic, EHD, thermal management system (100), as well as the system, are provided. The system comprises at least one EHD pump unit (110) comprising at least two electrodes for pumping the dielectric fluid and at least one enclosure (120) for accommodating the fluid within the system. The method comprises exposing the dielectric fluid to an ionizing process (122) configured to ionize the dielectric fluid, and operating the pump unit to circulate the exposed fluid in the enclosure.

19 Claims, 2 Drawing Sheets

Figure 1:
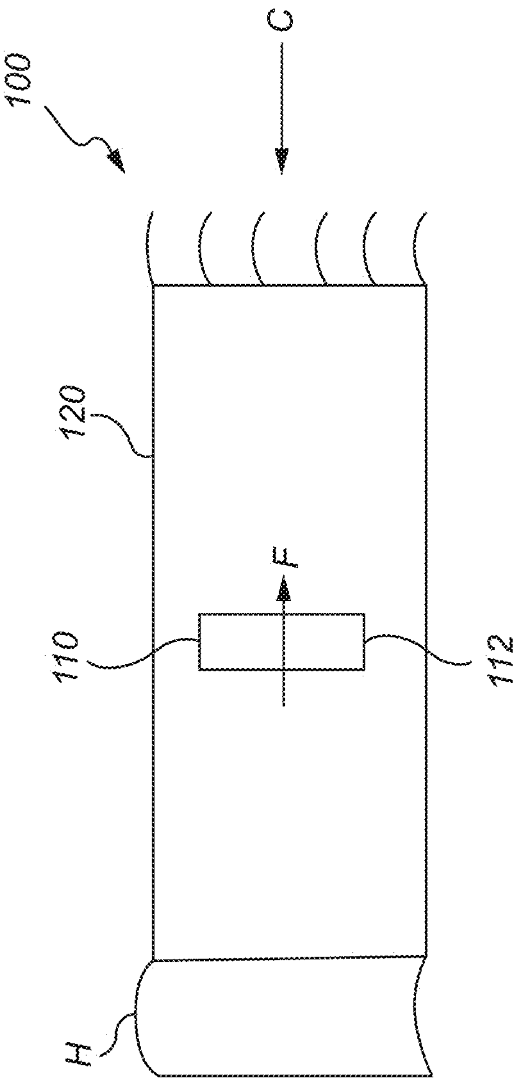

(51) Int. Cl.
*F04B 19/04* (2006.01)
*F28F 13/16* (2006.01)

(58) Field of Classification Search
CPC ......... G21K 1/04; F04B 17/00; F04B 19/006; F04B 19/04; F28F 13/16; F28F 2250/08; G01N 23/20025; G01N 23/223; G01N 23/2204; G01N 33/24; G01N 2223/307; G01N 2223/076; G01N 2223/03; G01N 33/2858; G01N 33/2888; G01N 33/30; G01N 21/51; G01N 23/04; G01N 23/18; G01N 23/046; G01N 2223/31; G01N 2223/419; G01N 23/10; G01N 23/083; G01N 2223/639; G01N 2001/022; G01N 2223/423; G01N 2223/637; G01N 15/0266; G01N 2015/0038; G01N 2015/0046; G01N 2223/635; G01N 2223/618; G01N 27/226; G01N 27/44791; A61B 6/54; A61B 6/504; A61B 6/507; A61B 6/486; A61B 6/032; A61B 6/501; A61B 6/542; A61B 6/481; A61B 6/5217; A61B 6/027; A61B 6/4042; A61B 6/544; A61B 6/4035; A61B 6/06; G16H 50/30; H01J 35/065; H01J 35/06; H01J 35/16; H01J 35/112; H01J 35/18; H01J 35/045; H01J 35/04; H01J 35/08; H01J 35/12; H01J 35/14; H01J 35/153; H01J 35/116; H01J 2235/1262; H01J 2235/1216; H01J 35/13; H01J 2235/163; H01J 2235/083; H01J 2235/1204; H01J 2235/062; H01J 2235/18; H01J 2235/1295; H01J 35/186; A61L 2/082; H05G 1/04; H05G 1/06; H05G 1/025; H05G 1/60; H05G 1/44; H05G 1/36; Y10T 29/49616; G01V 5/00; B01J 19/125; B01J 2219/0879; H01L 23/467; H01L 2924/0002; H01L 2924/00; H05K 7/20236; H05K 7/20281; B01L 3/50273; B01L 3/502792; G03F 1/82; G02F 1/1303; H05F 3/06; H10K 71/13
USPC ............................................................ 378/66
See application file for complete search history.

(56) References Cited

U.S. PATENT DOCUMENTS

| | | | |
|---|---|---|---|
| 8,467,168 B2 | 6/2013 | Honer et al. | |
| 2006/0207883 A1 | 9/2006 | Koval et al. | |
| 2010/0150738 A1 | 6/2010 | Gimsa et al. | |
| 2010/0155025 A1 | 6/2010 | Jewell-Larsen et al. | |
| 2015/0264790 A1* | 9/2015 | Miyagi ..................... | G03F 1/82 378/66 |
| 2015/0337815 A1 | 11/2015 | Roy et al. | |
| 2017/0138901 A1 | 5/2017 | Norton | |
| 2018/0117209 A1* | 5/2018 | Clack .................. | B01D 53/323 |
| 2018/0166360 A1 | 6/2018 | Thorslund et al. | |
| 2018/0304621 A1* | 10/2018 | Byun ....................... | B41J 2/072 |
| 2021/0082786 A1 | 3/2021 | Thorslund et al. | |

FOREIGN PATENT DOCUMENTS

| | | | |
|---|---|---|---|
| EP | 3304589 | A1 | 4/2018 |
| FR | 1510823 | A | 1/1968 |
| GB | 1274875 | A | 5/1972 |
| JP | 2000-222072 | A | 8/2000 |
| JP | 2000-515911 | A | 11/2000 |
| JP | 2006158169 | A | 6/2006 |
| JP | 2019-506123 | A | 2/2019 |
| WO | 98/04653 | A1 | 2/1998 |
| WO | 2016/195570 | A1 | 12/2016 |
| WO | 2017/127017 | A1 | 7/2017 |

* cited by examiner

ELECTROHYDRODYNAMICS SYSTEM AND METHOD

CROSS REFERENCE TO RELATED APPLICATIONS

This application is the National Stage Entry under 35 U.S.C. § 371 of Patent Cooperation Treaty Application No. PCT/EP2020/081239, filed 6 Nov. 2020, which claims priority from Sweden Application No. 1951280-5, filed 8 Nov. 2019, the contents of each of which are hereby incorporated by reference herein in their entireties.

TECHNICAL FIELD

The present invention relates to electrohydrodynamics (EHD), and more specifically to the use of EHD for thermal management of heat generating components.

BACKGROUND

Electronic components in, for example, computing systems, electric vehicles, satellites, electronics, etc., are constantly improved in terms of size and performance. The performance of electronic systems is however often limited by the thermal management techniques available. Smaller components with higher power dissipation mean greater heat generation in smaller areas. As a result, more efficient thermal management is required for keeping the components within an appropriate temperature range. In other words, there is a growing need for increased efficiency, both in terms of volume requirements and energy.

One attempt to address these issues is with the use of electrohydrodynamic thermal management systems, in which an electrical field is used to create a flow in a dielectric fluid. This may prove more efficient than, for example, a traditional fan cooling. However, even though the EHD system offers thermal management by circulating a thermal management fluid in a relatively energy efficient manner, there is a need for an increased efficiency in EHD thermal management systems.

SUMMARY

An object of the present invention is to provide a method of altering one or more properties of a dielectric fluid for use in an EHD thermal management system. The system may comprise at least one EHD pump unit comprising at least two electrodes for pumping the dielectric fluid, and an enclosure for accommodating the fluid within the system. The method may comprise the steps of exposing the dielectric fluid to an ionizing process configured to ionize the dielectric fluid, and to operate the pump unit to circulate or at least cause the exposed fluid to flow in the EHD system. For example, the ionizing process may comprise an ionizing irradiation of the dielectric fluid.

The dielectric fluid is exposed to the ionizing process in at least one of: a part of the enclosure, wherein a wall portion of the enclosure is exposed to the ionizing process, a location separated from the EHD thermal management system, from which the fluid is added to the EHD thermal management system after exposure, and within the enclosure, wherein the dielectric fluid is exposed to the ionizing process by a substance located within said enclosure.

The present invention is based on the realization that by exposing the dielectric fluid to an ionizing process configured to ionize the dielectric fluid, the pumping efficiency may be improved. This allows for an increased flow rate compared to non-ionized liquid, and thus a better cooling effect.

The proposed EHD system may comprise at least one pump unit that may be arranged within, or connected to, the enclosure in which the dielectric fluid is held. A cooling effect may be achieved by allowing the dielectric fluid to flow in order to transport heat energy away from the component, or area, in need of cooling. Similarly, a heating effect may be achieved by allowing the dielectric fluid to flow in order to transport heat energy to the component or region to be heated. In one example, the EHD system may be arranged to allow the dielectric fluid to circulate between a heat generating side of the system and a cooling side of the system, which for example may comprise a heat exchanger or heat sink.

The pump unit may be configured to create a flow in the fluid. The pump unit may comprise at least two electrodes, which may be separated from each other such that a second one of the electrodes is located in a downstream direction from a first one of the electrodes. The two electrodes may be connectable to a voltage source to create a field that affects the dielectric fluid such that a flow is created. The flow rate may be changed by varying the voltage applied to the electrodes. By decreasing the voltage, the fluid may lose momentum and the flow be decreased. Thus, by controlling the voltage, the cooling effect of the system can be adjusted.

Preferably, at least one of the electrode(s), such as the emitter electrode, may be elongated in the flow direction, such that a height as seen in the flow direction is greater than a width as seen in a directions orthogonal to the flow direction. This configuration may improve the electric field properties with respect to the corona discharge, which is believed to be the underlying mechanism accelerating the fluid between the electrodes.

By the term "ionizing process", it is here meant a process which is configured to ionize the dielectric fluid. More specifically, the ionizing process may encompass exposing the dielectric fluid to a radiation process that carries sufficient energy or is otherwise able to detach electrons from atoms or molecules. The ionizing process may comprise an ionizing irradiation of the dielectric fluid. The ionizing process may alternatively, or in combination with the (ir) radiation, comprise subjecting the dielectric fluid to one or more ionizing additives. Hence, without acquiescing to a particular physical model, exposing the dielectric fluid to an ionizing process is believed to cause the fluid to ionize and break down into other more easily ionizable chains of molecules. This altering of the characteristics of dielectric fluid may, when used in an EHD system, improve the pumping effect induced by the electrical field of the EHD unit and cause the fluid to flow at a higher velocity compared to what would have been achieved if the dielectric fluid were not exposed to such ionization process. The increased flow will in a thermal management system mean a greater cooling effect and improved power efficiency.

It will be appreciated that the dielectric fluid may be ionized at different stages of the EHD system's lifetime. Further, the ionization may also be carried out at different locations within or outside the EHD system. For example, the entire system, or only a part of it, such as the enclosure, could be exposed to a radiation from the outside, whilst the dielectric fluid is located within the system. In another example the dielectric fluid may be exposed to a radiation, or an ionizing additive, at a location separated from the enclosure and then added to the system at a later stage. Yet another example may be to add a small substance of radiating material, or an additive to the system, preferably within the enclosure, in order to expose the dielectric fluid to the ionization as it flows in the system. This may allow for the dielectric fluid to be exposed continuously, throughout the use of the system.

According to a second aspect of the invention, an EHD thermal management system comprising at least one pump unit is provided, configured in a manner as previously described. The system may comprise a dielectric fluid. The EHD thermal management system comprises at least two electrodes for pumping the dielectric fluid, and at least one enclosure for accommodating said dielectric fluid. The EHD thermal management system is configured to expose the dielectric fluid to an ionizing process configured to ionize the dielectric fluid.

The EHD system utilizes the characteristics of dielectric fluid exposed to the ionizing process. This may improve the pumping effect induced by the electrical field of the EHD unit and cause the fluid to flow at a higher velocity compared to what would have been achieved if the dielectric fluid was not exposed to such ionization process. The EHD thermal management system proposed may thus feature a greater cooling effect and an improved power efficiency. The ionizing process of the EHD system may comprise any steps of the ionizing process as previously described.

Thus, the first and second aspect of the present invention share a common general inventive concept or idea wherein dielectric fluid is exposed to an ionizing process.

By the term "dielectric fluid", it is here meant a dielectric material in a liquid or fluid state. Examples of dielectric fluids that can be pumped by means of embodiments of the invention may encompass 3M™ Novec™ (7000, 7100, 7200, 7500, 7700, 72DE, 71DA), Galden®HT (70, 110, 135, 72DE, 71DA), fluorinated fluids, hydrocarbon fluids, etc., or a combination thereof.

According to an embodiment of the present invention, the dielectric fluid may further comprise at least one additive. The additive may be in a fluid form or a solid form. For example, the additive may comprise a salt or any other form of ions which may be added to, and preferably dissolved in, the dielectric fluid. This may advantageously further increase the ionizing process of the dielectric fluid.

According to an embodiment of the present invention, the ionizing process comprises an ionizing irradiation of the dielectric fluid. It will be appreciated that in the present embodiment, the dielectric fluid may be ionized in an efficient manner and/or during a relatively long period of time. This may, for example, be advantageous in areas where a continuous exposure to an ionizing process is desired.

According to an embodiment of the present invention, the ionizing irradiation is generated from at least one radioactive isotope. The radioactive isotope may for example comprise, but is not limited to, Cobolt 60 or Americum. The ionizing (ir)radiation may further be generated from an electrically generated X-ray radiation. This is advantageous as the source of the ionizing radiation may be selected, for example, depending on the intended use, availability and/or cost efficiency. Furthermore, different radioactive isotopes may offer different levels of ionizing radiation and may thus be suitable in different systems. This may allow for a more accessible and cost-efficient system which furthermore may be customized for specific preconditions.

According to an embodiment of the present invention, the dielectric fluid is selected from the group consisting of a fluorinated fluid and a hydrocarbon fluid. The dielectric fluid may alternatively comprise a combination of the dielectric fluid as exemplified and other molecules or additives. It will be appreciated that combinations thereof may further increase the efficiency of the dielectric fluid in an EHD thermal management system.

According to an embodiment of the present invention, the enclosure may take the form of an enclosed passage, for example, defining a closed loop, adapted to convey a circulating flow of fluid. This specific configuration of the enclosure may be advantageous as the specific enclosure may provide a more efficient flow, as all fluid within the enclosure will be encouraged to move in the same direction.

According to an embodiment of the present invention, the pump unit is arranged in order to cover an entire cross-section of the closed loop configured enclosure. This is advantageous as a maximal amount of dielectric fluid in the given cross section will be subject to the pump unit, in other words, all fluid has to pass through the pump unit in order to circulate. As a result, an increased efficiency of the circulation of the dielectric fluid, and thus also the cooling effect, may be achieved. Further, the pump unit may not only be capable of inducing a flow in the dielectric fluid, but also to impede or even prevent the flow. In other words, the pump unit may be configured to operate as a switch capable of opening and closing the passage, which allows for an improved control of the flow.

According to an embodiment of the present invention, the at least two electrodes of the pump unit are arranged in a grid structure. For example, electrodes may be positioned either in a common plane or in different layers. Utilizing a grid structure may allow a further increase in the efficiency of the pump unit and allows for an increased control of the thermal management system.

DETAILED DESCRIPTION OF THE DRAWINGS

A few example embodiments of the invention will be described for illustrative purposes in the following.

FIG. 1 shows an EHD thermal management system 100 comprising a pump unit 110 and an enclosure 120 for dielectric fluid. Also displayed are a heat source H and a cooler area C, on opposite ends of the enclosure 120. A flow, F, is created by the pump unit 110, which in this embodiment may be located within the enclosure 120, where dielectric fluid is held. The flow F causes the dielectric fluid to circulate between the hot side H and the cooler area C so as to transport thermal energy from the heat source H towards the cooler area C.

Figure 2:
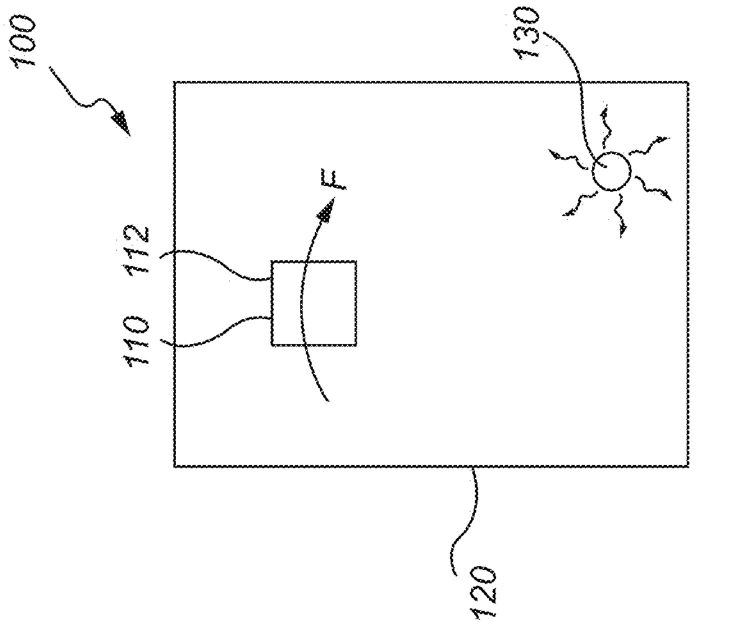

FIG. 2 shows an EHD thermal management system 100 according to an embodiment. Here, the pump unit 110 and a device for exposing or subjecting the dielectric fluid to an ionizing process, exemplified as a radiation source 130, are located within the enclosure 120. The enclosure 120 is formed as a single chamber similar to the enclosure disclosed in FIG. 1. The pump unit 110 may be arranged to induce the flow F, preferably at a position relatively close or adjacent to a wall portion of the enclosure, to induce a motion or flow F of the fluid in a direction along the wall portion. The flowing dielectric fluid may be exposed to ionizing radiation 122 from the radiating source 130 located within the enclosure 120. The radiating source 130 may for example comprise a radioactive isotope such as Cobolt 60 or Americum. Other embodiments may utilize electrically generated X-ray radiation as an ionizing means. The setup with a radiating source 130 located within the enclosure may allow for the dielectric fluid to be continuously exposed to radiation 122 throughout the system's operation. This may result in increasing the lifespan of the irradiating effect on the dielectric fluid, and also providing EHD systems having a very long lifespan.

It should be noted that the dielectric fluid may be exposed to radiation at different points in time, locations, to a certain amount, or using different radiating source materials and dielectric fluids, and that the examples discussed with reference to the appended drawings merely are illustrative examples. According to some embodiments of the invention the fluid may be exposed to radiation separately from the EHD system and added to the system at a later stage. It will be appreciated that not the entire amount of said fluid has to be exposed to radiation. In some examples, exposed fluid could be added to the fluid in the EHD system, thus forming a radiated additive to the total amount of fluid in the system. It is also appreciated that the radiation may be provided from within the enclosure as well as from a source positioned outside the enclosure and/or the entire system. One example of such arrangement is disclosed in FIG. 3.

Figure 3:
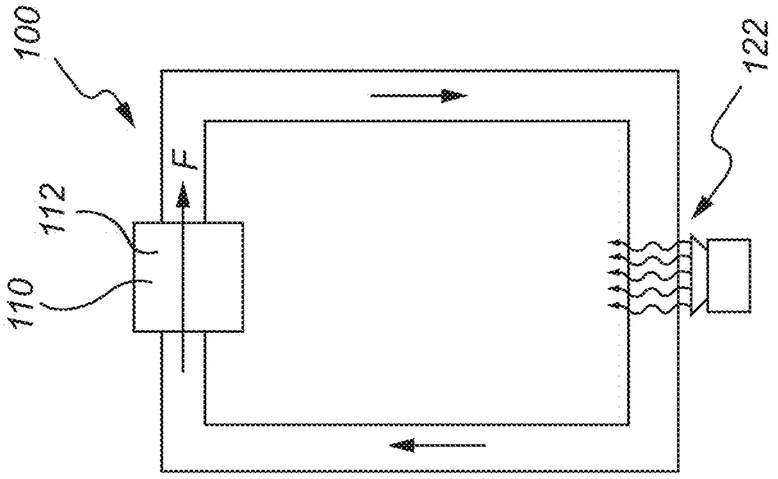

FIG. 3 depicts an embodiment in which the enclosure 120 is formed as a passage leading fluid through a closed loop. The enclosure 120 may e.g. be formed as a tube or channel wherein the end is connected to the beginning in order to allow for a continuous and repeated flow of a circulating fluid in a closed loop system.

The pump unit 110 may be arranged to cover an entire cross section of the enclosure 120, as indicated in FIG. 3. Alternatively, the pump unit 110 may cover only a part of the cross section in order to allow fluid to pass at the side of the pump unit 100. By arranging the pump unit 110 to cover the entire cross section of the passage 120, all fluid has to pass through the pump unit 110 in order to circulate. As a result, the pump unit 110 may not only be capable of inducing a flow F in the dielectric fluid, but also to impede or even prevent the flow F. In other words, the pump unit 110 may be configured to operate as a switch capable of opening and closing the passage 120, which allows for an improved control of the flow.

As already mentioned, the irradiation 122 of the fluid may in this example be provided from outside of the system. As depicted, part of the enclosure may be subject to ionizing radiation 122, which may penetrate the wall of the enclosure and reach the dielectric fluid. Other embodiments may have the enclosure 120 exposed to radiation 122 in its entity. The radiating source 130 may be placed directly on the system or distanced from it.

LIST OF EMBODIMENTS

1. A method for altering one or more properties of a dielectric fluid for use in an electrohydrodynamic, EHD, thermal management system (100), the system comprising at least one EHD pump unit (110) comprising at least two electrodes (112) for pumping the dielectric fluid and at least one enclosure (120) for accommodating the fluid within the system, the method comprising:
   exposing the dielectric fluid to an ionizing process (122) configured to ionize the dielectric fluid; and
   operating the pump unit to circulate the exposed fluid in the enclosure; wherein the dielectric fluid is exposed to the ionizing process in at least one of
   a part of said enclosure, wherein a wall portion of the enclosure is exposed to said ionizing process,
   a location separated from said EHD thermal management system, from which the fluid is added to said EHD thermal management system after exposure, and
   within said enclosure, wherein the dielectric fluid is exposed t the ionizing process by a substance (130) located within said enclosure.
2. The method according to embodiment 1, wherein the ionizing process comprises an ionizing irradiation of the dielectric fluid.
3. The method according to embodiment 2, wherein the ionizing irradiation is generated from at least one of a radioactive isotope and an electrically generated X-ray radiation.
4. The method according to any preceding embodiment, wherein the dielectric fluid is selected from the group consisting of a fluorinated fluid and a hydrocarbon fluid.
5. The method according to any preceding embodiment, wherein the dielectric fluid further comprises at least one additive.
6. The method according to any preceding embodiment, wherein the enclosure is formed as an enclosed passage adapted to convey a circulating flow of the fluid.
7. The method according to embodiment 6, wherein the pump unit is arranged to cover an entire cross section of the passage.
8. The method according to any preceding embodiment, wherein the at least two electrodes are formed as grid structures.
9. An electrohydrodynamic, EHD, thermal management system (100) comprising at least one pump unit (110) comprising at least two electrodes (112) for pumping a dielectric fluid, and at least one enclosure (120) for accommodating said dielectric fluid, wherein the EHD thermal management system is configured to expose the dielectric fluid to an ionizing process (122) configured to ionize the dielectric fluid.
10. The EHD thermal management system according to embodiment 9, wherein the dielectric fluid is exposed to the ionizing process in at least one of:
    a part of said enclosure, wherein a wall portion of the enclosure is exposed to said ionizing process,
    a location separated from said EHD thermal management system, from which the fluid is added to said EHD thermal management system after exposure, and
    within said enclosure, wherein the dielectric fluid is exposed to the ionizing process by a substance (130) located within said enclosure.
11. The EHD thermal management system according to embodiment 9 or 10, wherein the ionizing process comprises an ionizing irradiation of the dielectric fluid.
12. The EHD thermal management system according to embodiment 11, wherein the ionizing irradiation is generated from at least one of a radioactive isotope and an electrically generated X-ray radiation.
13. The EHD thermal management system according to any of embodiments 9-12, wherein the dielectric fluid is selected from the group consisting of a fluorinated fluid and a hydrocarbon fluid.
14. The EHD thermal management system according to any of embodiments 9-13, wherein the dielectric fluid further comprises at least one additive.
15. The EHD thermal management system according to any of embodiments 9-14, wherein the enclosure is formed as an enclosed passage adapted to convey a circulating flow of the fluid.

16. The EHD thermal management system according to embodiment 15, wherein the pump unit is arranged to cover an entire cross section of the passage.

17. The EHD thermal management system according to any of embodiments 8-16, wherein the at least two electrodes are formed as grid structures.

The invention claimed is:

1. A method for use in an electrohydrodynamic (EHD) thermal management system, the method comprising:

exposing a dielectric fluid to an ionizing irradiation from a radiating source, thereby ionizing the dielectric fluid; and operating at least one EHD pump unit comprising at least two electrodes for pumping the dielectric fluid to circulate the exposed fluid in an enclosure for accommodating the dielectric fluid within the system;

wherein the radiating source is arranged separately from the at least one EHD pump unit; and wherein the dielectric fluid is exposed to the ionizing irradiation from the radiating source in at least one of:

a part of said enclosure, wherein a wall portion of the enclosure is exposed to said ionizing irradiation;

a location separated from said EHD thermal management system, from which location the dielectric fluid is added to said EHD thermal management system after exposure; or within said enclosure, wherein the dielectric fluid is exposed to the ionizing irradiation by a substance located within said enclosure.

2. The method of claim 1, wherein the ionizing irradiation is generated from at least one of a radioactive isotope or an electrically generated X-ray radiation.

3. The method of claim 1, wherein the dielectric fluid is a fluorinated fluid or a hydrocarbon fluid.

4. The method of claim 1, wherein the dielectric fluid further comprises at least one additive.

5. The method of claim 1, wherein the enclosure is formed as an enclosed passage adapted to convey a circulating flow of the dielectric fluid.

6. The method of claim 5, wherein the EHD pump unit is arranged to cover an entire cross section of the passage.

7. The method of claim 1, wherein the at least two electrodes are formed as grid structures.

8. The method of claim 1, wherein the at least one EHD pump unit is at least partially arranged within the enclosure, and wherein the radiating source is arranged within the enclosure.

9. The method of claim 1, wherein the at least one EHD pump unit is at least partially arranged within the enclosure, and wherein the radiating source is arranged outside of the enclosure.

10. An electrohydrodynamic (EHD) thermal management system comprising:

a radiating source;

at least one pump unit comprising at least two electrodes for pumping a dielectric fluid; and at least one enclosure for accommodating said dielectric fluid;

wherein the radiating source is arranged separately from the at least one pump unit; and wherein the system is configured to expose the dielectric fluid to an ionizing irradiation from the radiating source to ionize the dielectric fluid.

11. The EHD thermal management system of claim 10, wherein the dielectric fluid is exposed to the ionizing irradiation from the radiating source in at least one of:

a part of said enclosure, wherein a wall portion of the enclosure is exposed to said ionizing irradiation;

a location separated from said EHD thermal management system, from which location the dielectric fluid is added to said EHD thermal management system after exposure; or within said enclosure, wherein the dielectric fluid is exposed to the ionizing irradiation by a substance located within said enclosure.

12. The EHD thermal management system of claim 11, wherein the ionizing irradiation is generated from at least one of a radioactive isotope and an electrically generated X-ray radiation.

13. The EHD thermal management system of claim 10, wherein the dielectric fluid is selected from the group consisting of a fluorinated fluid and a hydrocarbon fluid.

14. The EHD thermal management system of claim 10, wherein the dielectric fluid further comprises at least one additive.

15. The EHD thermal management system of claim 10, wherein the enclosure is formed as an enclosed passage adapted to convey a circulating flow of the dielectric fluid.

16. The EHD thermal management system of claim 15, wherein the pump unit is arranged to cover an entire cross section of the passage.

17. The EHD thermal management system of claim 10, wherein the at least two electrodes are formed as grid structures.

18. The EHD thermal management system of claim 10, wherein the at least one pump unit is at least partially arranged within the enclosure, and wherein the radiating source is arranged within the enclosure.

19. The EHD thermal management system of claim 10, wherein the at least one pump unit is at least partially arranged within the enclosure, and wherein the radiating source is arranged outside of the enclosure.

* * * * *